United States Patent
Koenig, II

(10) Patent No.: US 11,169,304 B2
(45) Date of Patent: Nov. 9, 2021

(54) METHOD AND ASSEMBLY FOR COATING A SUBSTRATE

(71) Applicant: Transitions Optical, Inc., Pinellas Park, FL (US)

(72) Inventor: Jerry L. Koenig, II, Largo, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 15/556,310

(22) PCT Filed: Jun. 9, 2015

(86) PCT No.: PCT/US2015/034834
§ 371 (c)(1),
(2) Date: Sep. 7, 2017

(87) PCT Pub. No.: WO2016/144377
PCT Pub. Date: Sep. 15, 2016

(65) Prior Publication Data
US 2018/0074231 A1    Mar. 15, 2018

Related U.S. Application Data

(60) Provisional application No. 62/130,133, filed on Mar. 9, 2015.

(51) Int. Cl.
| | | |
|---|---|---|
| G02B 1/12 | (2006.01) | |
| B29D 11/00 | (2006.01) | |
| B05D 1/00 | (2006.01) | |
| B05D 1/02 | (2006.01) | |
| B05D 1/18 | (2006.01) | |
| B05D 1/28 | (2006.01) | |
| B05D 3/00 | (2006.01) | |
| G02B 1/04 | (2006.01) | |
| G02C 7/10 | (2006.01) | |

(52) U.S. Cl.
CPC ............... *G02B 1/12* (2013.01); *B05D 1/005* (2013.01); *B05D 1/02* (2013.01); *B05D 1/18* (2013.01); *B05D 1/28* (2013.01); *B05D 3/007* (2013.01); *B29D 11/00865* (2013.01); *G02B 1/041* (2013.01); *G02C 7/102* (2013.01); *G02C 2202/16* (2013.01)

(58) Field of Classification Search
CPC .......................... G02B 7/026; B29D 11/00913
See application file for complete search history.

(56) References Cited

U.S. PATENT DOCUMENTS

| | | | |
|---|---|---|---|
| 3,892,892 A | * | 7/1975 | Hofer ................. B05D 1/32 427/97.5 |
| 6,187,444 B1 | | 2/2001 | Bowles, III et al. |
| | | | (Continued) |

FOREIGN PATENT DOCUMENTS

CN        101356453 A        1/2009

*Primary Examiner* — Alexa A Rolland
(74) *Attorney, Agent, or Firm* — The Webb Law Firm

(57) ABSTRACT

A method for making a coated substrate (10), such as a polymeric lens (11), includes positioning a heat sink (22) of a heat-conductive and/or heat reflective material adjacent a sidewall (16) of the substrate (10) and subjecting the substrate (10) to a coating and curing process. A coating assembly (76) includes a substrate (10), such as a polymeric lens (11), and a heat sink (22) adjacent a sidewall (16) of the substrate (10).

10 Claims, 3 Drawing Sheets

(56) References Cited

U.S. PATENT DOCUMENTS

| | | |
|---|---|---|
| 7,410,691 B2 | 8/2008 | Blackburn et al. |
| 7,452,611 B2 | 11/2008 | Blackburn et al. |
| 2009/0071591 A1 | 3/2009 | Glacet et al. |
| 2009/0133625 A1 | 5/2009 | Takahashi et al. |
| 2010/0102025 A1* | 4/2010 | Eagerton ............. C03C 17/3417 216/13 |
| 2014/0366363 A1* | 12/2014 | Meschenmoser ........................... B29D 11/00884 29/557 |

* cited by examiner

METHOD AND ASSEMBLY FOR COATING A SUBSTRATE

CROSS REFERENCE TO RELATED APPLICATIONS

This present application is a national stage of International Patent Application No. PCT/US2015/034834, filed Jun. 9, 2015, which claims priority to U.S. Provisional Application No. 62/130,133 filed on Mar. 9, 2015, herein incorporated by reference in their entirety.

BACKGROUND OF THE INVENTION

Field of the Invention

This invention relates generally to the coating of polymeric substrates and, more particularly, to methods and devices for reducing and/or preventing the cracking of a polymeric ophthalmic lens during the curing of an applied coating composition.

Technical Considerations

A photochromic material changes color when irradiated with ultraviolet (UV) radiation and then returns to its original color when the irradiation ceases. One application of this phenomenon is in the manufacture of ophthalmic lenses capable of filtering radiation as a function of the intensity of the radiation. The use of photochromic materials combined with a polymeric lens substrate provides a photochromic polymeric ophthalmic lens that is considerably lighter in weight than conventional photochromic glass ophthalmic lenses.

One way to make a photochromic polymeric ophthalmic lens is by incorporating photochromic organic compounds into a polymerizable photochromic coating composition, depositing the photochromic coating composition onto the surface of a polymeric lens substrate, and then curing the photochromic coating composition to form a photochromic layer on the lens. A protective layer can be formed over the photochromic layer by depositing and curing a polymerizable protective coating composition. Curing of the photochromic and protective coating compositions typically is accomplished by heating or ultraviolet irradiation.

A problem with the current manufacturing of photochromic polymeric ophthalmic lenses is that some polymeric lens substrates tend to chip or crack during the curing process for the photochromic layer or the protective layer. These chips or cracks typically occur around the edge of the polymeric substrate and radiate inwardly. The damaged outer region makes these lenses undesirable for most commercial uses.

One current method to address this problem is to cut away a portion of the outer circumferential region of the polymeric lens substrate prior to coating and curing. However, this adds additional steps to the coating process, which increases the time and cost involved in making the coated lens. Also, this requires additional equipment to trim away the outer region of the lens. Further, this results in a waste of lens material.

Therefore, it would be desirable to provide a method and/or device for manufacturing a coated polymeric substrate, such as a photochromic polymeric ophthalmic lens, that eliminates or at least reduces the technical problem of cracking of the outer region of the polymeric substrate during the manufacturing process.

SUMMARY OF THE INVENTION

A method of making a coated substrate comprises the steps of applying at least one coating composition over at least a portion of an outer surface of a substrate, and curing the at least one coating composition to form at least one coating layer. The method includes positioning a heat sink adjacent a sidewall of the substrate.

A coating assembly for making a coated substrate comprises a substrate having a sidewall and a heat sink located adjacent the sidewall.

DESCRIPTION OF THE INVENTION

Figure 1:
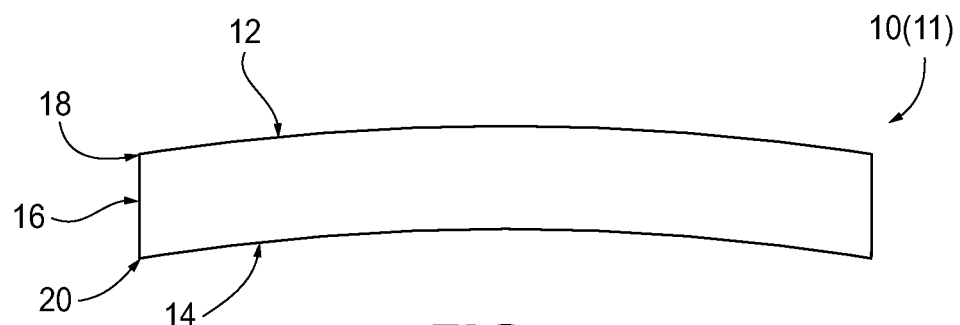
FIG. 1 is a side view of a polymeric substrate in the form of a polymeric lens.

Spatial or directional terms used herein, such as "left", "right", "above", "below", and the like, relate to the invention as it is shown in the drawing figures. It is to be understood that the invention can assume various alternative orientations and, accordingly, such terms are not to be considered as limiting. All numbers used in the specification and claims are to be understood as being modified in all instances by the term "about". All ranges disclosed herein are to be understood to encompass the beginning and ending range values and any and all subranges subsumed therein. The ranges set forth herein represent the average values over the specified range. The term "over" means "farther from the substrate". For example, a second layer located "over" a first layer means that the second layer is located farther from the substrate than the first layer. The second layer can be in direct contact with the first layer or one or more other layers can be located between the second layer and the first layer. By "layer" is meant a region of a composition distinctive from other regions. The terms "polymer" or "polymeric" include oligomers, homopolymers, copolymers, and terpolymers. The term "ultraviolet radiation" means electromagnetic energy having a wavelength in the range of 100 nm to less than 380 nm.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

While not intending to be bound by this theory, it is believed that the cracking produced during the conventional coating and curing processes for some polymeric substrates is at least partly due to differences in the coefficient of thermal expansion between the polymeric material located in the central region of the substrate and the polymeric material at the outer circumferential region of the substrate. This difference in the coefficient of thermal expansion can be caused by one or more factors such as: incomplete polymerization of regions of the substrate material during production of the substrate, differing levels of polymerization of regions of the substrate material during production of the substrate, or compositional differences between different regions of the substrate material. These differences can be introduced by the method used to cast or form the substrate and/or the methods used to polymerize the substrate material.

A polymeric substrate 10 in the form of a polymeric lens 11 (e.g., a polymeric ophthalmic lens) is shown in FIG. 1. The substrate 10 has a first surface 12, a second surface 14, and a sidewall 16 extending around the circumferential perimeter of the substrate 10. In FIG. 1, the first surface 12 is illustrated as a convex outer surface. The term "outer" refers to a direction facing a direction of coating and/or a surface closer to the direction of coating. The second surface 14 is illustrated as a concave inner surface. The term "inner" refers to a direction facing away from the direction of coating and/or a surface farther from the direction of coating.

The sidewall 16 and the first surface 12 define a first edge 18 (outer edge). The sidewall 16 and the second surface 14 define a second edge 20 (inner edge).

Figure 2:
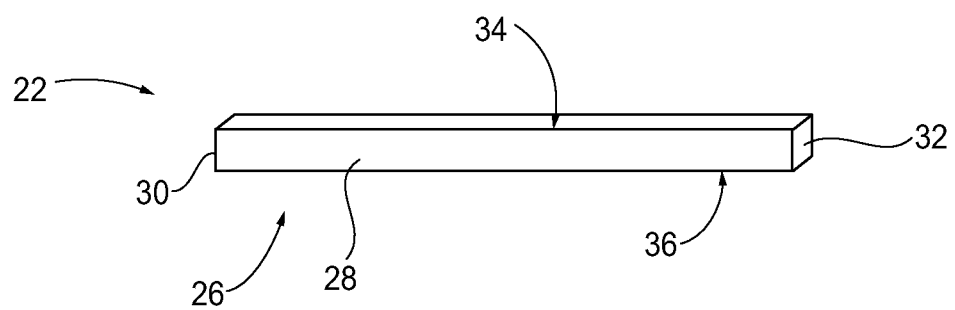
FIG. 2 is a perspective view of a heat sink in the form of a foil strip.

FIG. 2 illustrates an exemplary heat sink 22 of the invention. The term "heat sink" means a material or member that reflects and/or dissipates thermal energy. Suitable materials for the heat sink 22 include heat-conductive and/or heat reflective materials. Examples of suitable materials include metals from Groups IB to VIIIB of the Periodic Table of the Elements, as well as metal alloys comprising one or more of these metals. Particular examples include aluminum, steel, copper, gold, silver, brass, nitinol, and iron. The heat sink 22 may be a flexible or pliable member, i.e., a member that can be easily placed on and/or molded to one or more surfaces of a polymeric substrate. The heat sink 22 can also be in the form of a non-pliable heat conductive member.

The exemplary heat sink 22 illustrated in FIG. 2 comprises a flexible strip of metal foil 26 comprising an elongated, flexible body 28 having a first end 30, a second end 32, a first side 34 (outer side), and a second side 36 (inner side).

Figure 3:
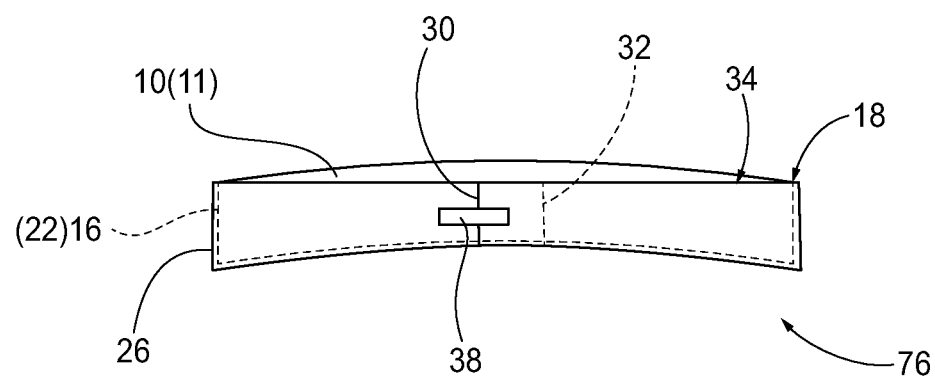
FIG. 3 is a side view of the lens of FIG. 1 with the heat sink of FIG. 2.
Figure 4:
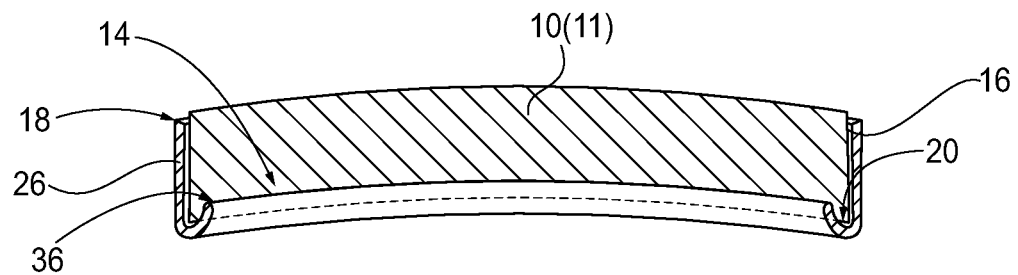
FIG. 4 is a side, sectional view of the lens and heat sink of FIG. 3.
Figure 5:
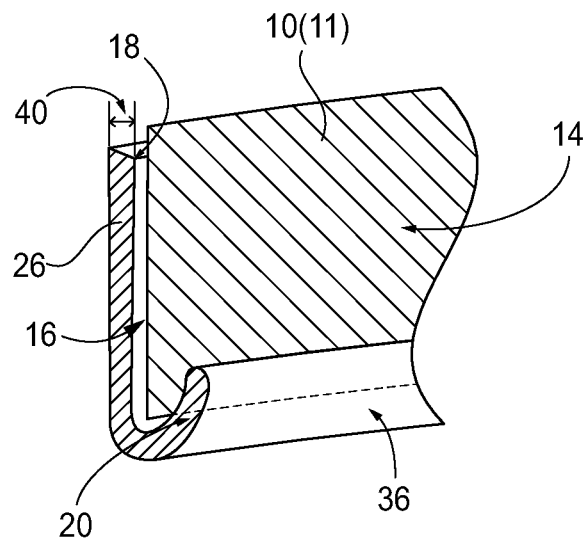
FIG. 5 is an enlarged view of a portion of an outer circumferential portion of FIG. 4.

FIGS. 3 to 5 illustrate the substrate 10 of FIG. 1 with the exemplary heat sink 22 of FIG. 2. As shown in FIG. 3, the metal foil 26 is wrapped around the sidewall 16 of the substrate 10 until the first end 30 is adjacent to or overlaps the second end 32. The metal foil 26 can be wrapped around the sidewall 16 several times to form a multilayer heat sink 22. The metal foil 26 can be held in place on the substrate 10 by any conventional means, such as a piece of adhesive tape 38.

As shown in FIGS. 3 and 4, the metal foil 26 can be positioned such that the first side 34 of the metal foil 26 is in the range of 0 mm to 1 mm, such as 0 mm to 0.5 mm, from the first edge 18. By "0 mm" is meant the first side 34 of the metal foil 26 is at the same level as the first edge 18. The metal foil 26 can be positioned such that the first side 34 of the metal foil 26 does not extend beyond the first edge 18 of the sidewall 16. Or, the metal foil 26 can be positioned such that the first side 34 of the metal foil 26 extends beyond the first edge 18. The body 28 of the metal foil 26 is in direct contact with the sidewall 16.

If the metal foil 26 is positioned such that the first side 34 does not extend beyond the first edge 18, during coating of the substrate 10 the coating material can run off of the first surface 12 and down the exterior surface of the metal foil 26. This provides the first surface 12 with a coating having a substantially uniform thickness across the entire first surface 12. If the first side 34 extends beyond the first edge 18, during coating of the substrate 10 the portion of the first side 34 extending beyond the first edge 18 acts as a dam trapping coating material around the peripheral edge of the first surface 12. This can form a ring of thicker coating material around the peripheral edge of the first surface 12. While typically not desired, this can be acceptable if the substrate 10 will be used in a device or for a purpose in which such a ring of thicker coating material is not detrimental.

As shown in FIGS. 4 and 5, the second side 36 of the metal foil 26 is folded around the second edge 20 of the sidewall 16 such that the second side 36 of the metal foil 26 contacts a portion of the second surface 14 of the substrate 10.

The use of a flexible metal foil as the heat sink 22 allows for ease in positioning, e.g., wrapping, the heat sink 22 around the circumference of the substrate 10 and also folding the second side 36 of the heat sink 22 around the second edge 20 and against the second surface 14 of the substrate 10.

Examples of materials suitable for the metal foil 26 include pliable metal foils, such as aluminum foil, steel foil, and/or copper foil. For example, the metal foil 26 can comprise aluminum foil.

The body 28 can have a thickness 40 in the range of 0.0025 inch to 0.0035 inch (0.0064 cm to 0.0089 cm), such as 0.003 inch (0.0076 cm). Or, the heat sink 22 can comprise a plurality of layers formed by wrapping one or more strips of metal foil 26 around the sidewall 16 until the cumulative foil layers have a total thickness 40 in the range of 0.0025 inch to 0.0035 inch (0.0064 cm to 0.0089 cm), such as 0.003 inch (0.0076 cm).

Figure 6:
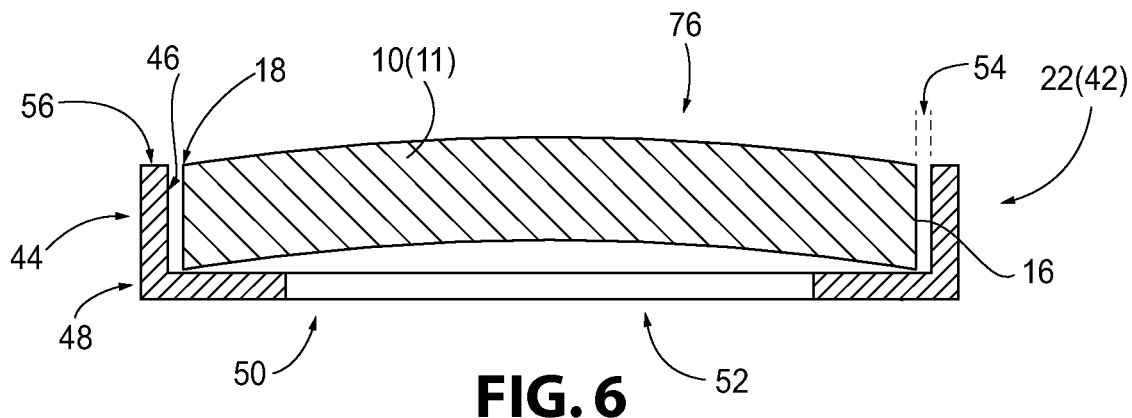
FIG. 6 is a side, sectional view of a polymeric substrate, in the form of a polymeric lens, located in a heat sink in the form of a rigid carrier.

Another exemplary heat sink 22 is illustrated in FIG. 6. In this example, the heat sink 22 is in the form of a solid, e.g., rigid or non-pliable, carrier 42 (lens carrier) having a sidewall 44 with an interior wall 46 and an exterior wall 48. The carrier 42 has a bottom 50. The bottom 50 can be a closed bottom or the bottom 50 can be an annular bottom having at least one opening 52. The diameter of the carrier 42 can be such that the interior wall 46 of the carrier 42 is spaced a distance 54 from the sidewall 16 when the substrate 10 is inserted into the carrier 42. The distance 54 can be in the range of 0 mm to 1 mm, such as 0 mm to 0.5 mm By "0 mm" is meant that the interior wall 46 is in direct contact with the sidewall 16 when the substrate 10 is placed in the carrier 42.

The carrier sidewall 44 is configured such that a first side 56 (outer side) of the carrier sidewall 44 is in the range of 0 mm to 1 mm, such as 0 mm to 0.5 mm, from the first edge 18 of the substrate 10 when the substrate 10 is inserted into the carrier 42. By "0 mm" is meant the outer side 56 of the carrier sidewall 44 is at the same level as the first edge 18 when the substrate 10 is inserted into the carrier 42. Or, the carrier sidewall 44 can be configured such that the first side 56 of the carrier sidewall 44 extends beyond the first edge 18 of the sidewall 16.

The carrier 42 can be made from a material selected from metals, metal alloys, and ceramic materials. For example, the carrier 42 can comprise a material selected from aluminum, steel, and copper. For example, the carrier 42 can comprise aluminum.

Figure 7:
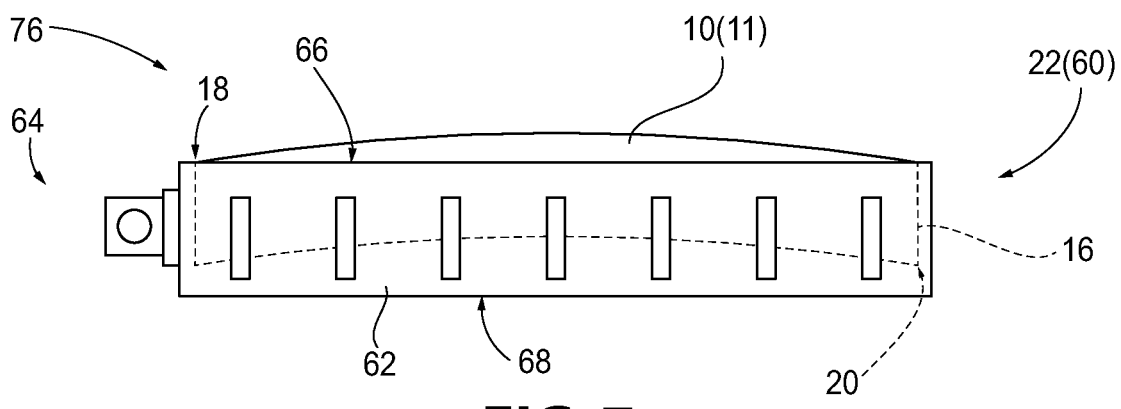
FIG. 7 is a side, sectional view of a polymeric substrate, in the form of a polymeric lens, engaged with a heat sink in the form of a flexible clamp.

Another exemplary heat sink 22 is illustrated in FIG. 7. In this example, the heat sink 22 is in the form of a flexible clamp 60, such as a flexible hose clamp, having a flexible metal strip 62 connected to a tightening device 64. The metal strip 62 can be positioned around the sidewall 16 and the tightening device 64 used to tighten the clamp 60 until the metal strip 62 contacts at least a portion of the sidewall 16. The metal strip 62 can be positioned such that a first side 66 (outer side) of the metal strip 62 is at a distance in the range of 0 mm to 1 mm, such as 0 mm to 0.5 mm, from the first edge 18. By "0 mm" is meant the first side 66 of the metal strip 62 is at the same level as the first edge 18. A second side 68 (inner side) of the metal strip 62 can be positioned to be at or adjacent the second edge 20. Or, the metal strip 62 can be sized such that the first side 66 of the metal strip 62 extends beyond the first edge 18 of the substrate 10 and/or the second side 68 of the metal strip 62 extends beyond the second edge 20 of the substrate 10.

Examples of materials suitable for the metal strip 62 include flexible metals, such as steel, for example stainless steel. Or examples include copper, aluminum, and nitinol.

Figure 8:
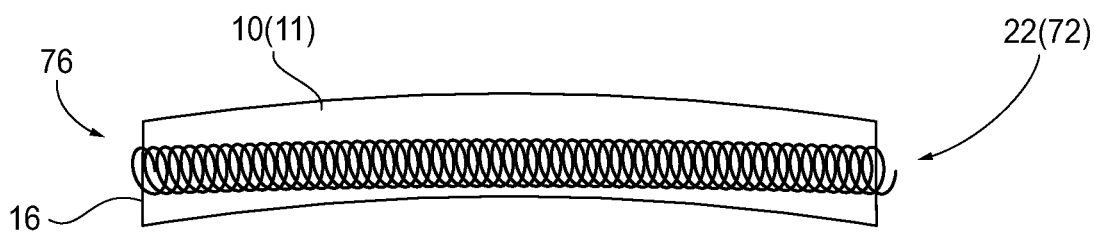
FIG. 8 is a side view of a polymeric substrate, in the form of a polymeric lens, engaged with a heat sink in the form of a metal spring.

A further exemplary heat sink 22 is illustrated in FIG. 8. In this example, the heat sink 22 is in the form of a flexible metal spring 72. The metal spring 72 can be positioned around and in contact with at least a portion of the lens sidewall 16.

A substrate 10, such as a polymeric substrate 10, such as a polymeric lens 11 (for example, a polymeric ophthalmic lens 11) combined with a heat sink 22 as described above defines a coating assembly 76. The coating assembly 76 can be subjected to conventional coating and/or curing processes to form a coated polymeric substrate 10, such as a coated polymeric lens 11, such as a coated polymeric ophthalmic lens 11, such as a photochromic polymeric ophthalmic lens 11. By using the coating assembly 76 rather than just subjecting a polymeric substrate 10 to conventional coating and curing processes, the frequency and/or severity of circumferential cracking of the substrate 10 is reduced.

An exemplary process of making a coated substrate 10, for example a coated polymeric lens 11, for example a photochromic polymeric ophthalmic lens 11, will be described first with particular reference to the heat sink 22 comprising a metal foil 22 illustrated in FIGS. 2 to 5. The metal foil 26 is positioned around, e.g., wrapped around, the sidewall 16 and secured in place with a piece of adhesive tape 38. The metal foil 26 can be positioned such that the first side 34 of the metal foil 26 does not extend beyond the first edge 18 of the substrate 10, e.g., lens 11. For example, the first side 34 of the metal foil 26 is positioned at the same level as the first edge 18 of the substrate 10. The second side 36 of the metal foil 26 is folded around the second edge 20 of the substrate 10, with at least a portion of the second side 36 of the metal foil 26 in direct contact a portion of the inner surface 14 of the substrate 10. The metal foil 26 can comprise aluminum foil. The metal foil 26 (whether one layer or multiple layers) can have a total thickness in the range of 0.0025 inch to 0.0035 inch (0.0064 cm to 0.0089 cm).

A photochromic coating composition comprising one or more photochromic materials is applied onto the outer surface 12 of the substrate 10, e.g., lens 11. This can be done by any conventional coating technique, such as spray coating, spin coating, spread coating, dip coating, and roll-coating. For example, the photochromic coating composition can be applied by spin coating. The photochromic coating composition can be any conventional photochromic coating composition. Examples of photochromic coating compositions are disclosed in U.S. Pat. Nos. 6,187,444; 6,218,055; 7,452,611; and 7,410,691.

Figure 9:
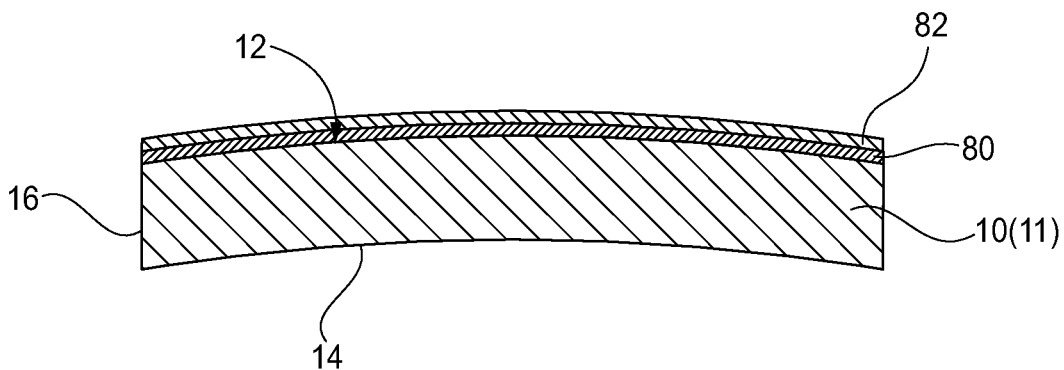
FIG. 9 is a side, sectional view of a coated polymeric substrate, such as a coated polymeric lens, for example a photochromic polymeric ophthalmic lens.

The coated lens 11 can then be subjected to a curing process to cure, i.e., polymerize, the photochromic coating composition to form a photochromic layer 80 (see FIG. 9) on the outer surface 12 of the lens 11.

The terms "cure" and/or "curing" refer to the process of forming a coating layer from a deposited coating composition. This curing can be by polymerizing the coating composition. The coating composition can be cured by any conventional method, such as by ultraviolet radiation or thermal curing. For thermal curing, the coated lens 11 is typically heated to a temperature of at least 100° C., such as at least 125° C. As discussed earlier, for some polymeric lenses, heating to these temperatures can cause chips and cracks to form in the lens 11. However, the use of a heat sink 22 of the invention reduces or eliminates this cracking.

Optionally, a protective layer 82 can be formed over the photochromic layer 80. By "protective layer" is meant a layer that helps to protect the underlying photochromic layer 80 and/or lens 11 from chemical and/or mechanical damage. For example, a protective coating composition can be applied over the photochromic layer 80. The coated lens 11 can be subjected to a curing process, such as described above, to polymerize the protective coating composition to form the protective layer 82 over the photochromic layer 80 (or over the first surface 12 if the photochromic layer 80 is not present). Examples of protective coating compositions also are disclosed in U.S. Pat. Nos. 6,187,444; 6,218,055; 7,452,611; and 7,410,691.

The metal foil 26 is then removed from the coated polymeric lens 11 by peeling off the adhesive tape 38 and unwrapping the metal foil 26 from the lens 11.

With the heat sink 22 in the form of a solid carrier 42, the lens 11 is placed in the carrier 42. The diameter of the carrier 42 can be such that the interior diameter of the carrier 42 is greater than the exterior diameter of the lens 11. This allows a gap between the sidewall 16 of the lens 11 and the interior wall 46 of the carrier sidewall 44 when the lens 11 is placed in the carrier 42.

The lens 11 and carrier 42 can then be coated and cured as described above to apply the photochromic layer 80 and/or the optional protective layer 82 onto the lens 11. Allowing a gap between the lens sidewall 16 and the interior wall 46 of the carrier sidewall 44 allows excess coating material to run down the outer surface of the sidewall 16 rather than forming a contiguous layer extending over the outer surface 12 of the lens 11 and the outer side 56 of the lens carrier sidewall 44. Such a contiguous layer makes the coated polymeric lens 11 harder to remove from the carrier 42 after the coating(s) have been formed.

With a heat sink 22 configured as a flexible metal clamp 60, the metal strip 62 is positioned around the lens sidewall 16. The first side 66 of the metal strip 62 can be positioned such that it does not extend beyond the first edge 18 of the lens 11. For example, the first side 66 of the strip 62 can be at the same level as the first edge 18 of the lens 11. If desired, the first side 66 of the metal strip 62 can extend beyond the first edge 18. The clamp 60 is tightened until the metal strip 62 contacts the sidewall 16.

The polymeric lens 10 can then be coated and cured as described above to apply the photochromic layer 80 and/or the optional protective layer 82. After the coating(s) have been formed, the clamp 60 can be loosened and the coated polymeric lens 11 removed.

With a heat sink configured as a flexible metal spring 72, the metal spring 72 is positioned around and in contact with the sidewall 16. The lens 11 can then be processed as described above to apply the photochromic layer 80 and, optionally, the protective layer 82. After the coating(s) have been formed, the spring 72 can be removed from around the coated polymeric lens 11.

When a heat sink 22 of the invention is used in a coating and curing process for a polymeric substrate 10, such as a polymeric lens 11, there is a reduced incidence of cracking of the lens 11 during the coating and curing process. While not being bound by this theory, it is believed that the heat sink 22 helps dissipate and/or reflect the heat around the circumferential edge of the lens 11 to help reduce disparities between the rate of thermal expansion of the central portion of the lens 11 compared to the rate of thermal expansion of the circumferential portion of the lens 11.

The invention can be further characterized in the following numbered clauses.

Clause 1: A method of making a coated substrate (10) comprises the steps of applying at least one coating composition over at least a portion of a first surface (12) of a substrate (10), and curing the at least one coating composition to form at least one coating layer (80, 82). The method includes positioning a heat sink (22) adjacent a sidewall (16) of the substrate (10). For example, the first surface (12) can be an outer surface.

Clause 2: The method of clause 1, wherein the substrate (10) is a polymeric substrate (10), such as a polymeric lens (11), such as a polymeric ophthalmic lens (11), such as a photochromic polymeric ophthalmic lens (11).

Clause 3: The method of clauses 1 or 2, wherein the heat sink (22) is spaced from the sidewall (16) by a distance in the range of 0 mm to 1 mm, such as 0 mm to 0.5 mm.

Clause 4: The method of any of clauses 1 to 3, wherein the heat sink (22) is in direct contact with the sidewall (16).

Clause 5: The method of any of clauses 1 to 4, wherein a first side (34, 56, 66) of the heat sink (22) does not extend beyond a first edge (18) of the substrate (10). For example, the first side (34, 56, 66) can be an outer side. For example, the first edge (18) can be an outer edge.

Clause 6: The method of any of clauses 1 to 5, wherein the heat sink (22) comprises a heat conductive and/or heat reflective material, such as a material selected from the group consisting of metals, metal alloys, and ceramic.

Clause 7: The method of any of clauses 1 to 6, wherein the heat sink (22) comprises a material selected from the group consisting of aluminum and stainless steel. For example, aluminum.

Clause 8: The method of any of clauses 1 to 7, wherein the heat sink (22) comprises a metal foil (26).

Clause 9: The method of clause 8, wherein a second side of (36) the metal foil (26) extends around a second edge (20) of the substrate (10) and at least a portion of the second side of (36) the metal foil (26) contacts at least a portion of a second surface (14) of the substrate (10). For example, the second side (36) of the metal foil (26) can be an inner side. For example, the second edge (20) can be an inner edge. For example, the second surface (14) can be an inner surface.

Clause 10: The method of clause 1, wherein the substrate (10) comprises a polymeric lens (11), such as a polymeric ophthalmic lens (11), the heat sink (22) comprises a metal foil (26), and the method comprises wrapping the metal foil (26) around and in direct contact with the sidewall (16), and wrapping at least a portion of a second side (36) of the metal foil (26) around a second edge (20) of the polymeric lens (11) and in direct contact with at least a portion of a second surface (14) of the polymeric lens (11). For example, the second side (36) of the metal foil (26) can be an inner side. For example, the second edge (20) can be an inner edge. For example, the second surface (14) can be an inner surface.

Clause 11: The method of any of clauses 1 to 7, wherein the heat sink (22) comprises a rigid carrier (42) having a sidewall (44) defining a hollow interior.

Clause 12: The method of any of clauses 1 to 11, including applying the at least one coating composition by a process selected from the group consisting of spray coating, spin coating, spread coating, dip coating, and roll-coating. For example, by spin coating.

Clause 13: The method of any of clauses 1 to 12, wherein the curing step comprises subjecting the at least one coating composition to a temperature of at least 100° C., such as at least 125° C.

Clause 14: The method of any of clauses 1 to 12, wherein the curing step comprises subjecting the at least one coating composition to ultraviolet radiation.

Clause 15: The method of any of clauses 1 to 14, wherein the at least one coating composition is selected from the group consisting of a photochromic coating composition and a protective coating composition.

Clause 16: A coating assembly (76) for making a coated substrate (10) comprises a substrate (10) having a sidewall (16) and a heat sink (22) located adjacent the sidewall (16).

Clause 17: The coating assembly (76) of clause 16, wherein the substrate (10) is a polymeric substrate (10), such as a polymeric lens (11), such as a polymeric ophthalmic lens (11), such as a photochromic polymeric ophthalmic lens (11).

Clause 18: The coating assembly (76) of clauses 16 or 17, wherein the heat sink (22) is spaced from the sidewall (16) by a distance in the range of 0 mm to 1 mm, such as 0 mm to 0.5 mm.

Clause 19: The coating assembly (76) of any of clauses 16 to 18, wherein the heat sink (22) is in direct contact with the sidewall (16).

Clause 20: The coating assembly (76) of any of clauses 16 to 19, wherein a first side (34, 56, 66) of the heat sink (22) does not extend beyond a first edge (18) of the substrate (10). For example, the first side (34, 56, 66) can be an outer side. For example, the first edge (18) can be an outer edge.

Clause 21: The coating assembly (76) of any of clauses 16 to 20, wherein the heat sink (22) comprises a heat conductive and/or heat reflective material, such as a material selected from the group consisting of metals, metal alloys, and ceramic.

Clause 22: The coating assembly (76) of any of clauses 16 to 21, wherein the heat sink (22) comprises a material selected from the group consisting of aluminum and stainless steel. For example, aluminum.

Clause 23: The coating assembly (76) of any of clauses 16 to 22, wherein the heat sink (22) comprises a metal foil (26).

Clause 24: The coating assembly (76) of clause 23, wherein at least a portion of a second side (36) of the metal foil (26) extends around a second edge (20) of the substrate

(10) and contacts at least a portion of a second surface (14) of the substrate (10). For example, the second side (36) of the metal foil (26) can be an inner side. For example, the second edge (20) can be an inner edge. For example, the second surface (14) can be an inner surface.

Clause 25: The coating assembly (76) of any of clauses 16 to 24, wherein the substrate (10) comprises a polymeric lens (11), such as a polymeric ophthalmic lens (11), wherein the heat sink (22) comprises a metal foil (26), wherein at least a portion of the metal foil (26) is in direct contact with the sidewall (16), and wherein a second side (36) of the metal foil (26) extends around a second edge (20) of the polymeric lens (11) and at least a portion of the second side (36) of the metal foil (26) is in direct contact with at least a portion of a second surface (14) of the polymeric lens (11). For example, the second side (36) of the metal foil (26) can be an inner side. For example, the second edge (20) can be an inner edge. For example, the second surface (14) can be an inner surface.

Clause 26: The coating assembly (76) of any of clauses 16 to 22, wherein the heat sink (22) comprises a rigid carrier (42) having a sidewall (44) defining a hollow interior.

Clause 27: The coating assembly (76) of any of clauses 16 to 22, wherein the heat sink (22) comprises a clamp (60) having a flexible metal strip (62).

Clause 28: The coating assembly (76) of any of clauses 16 to 22, wherein the heat sink (22) comprises a metal spring (72).

Clause 29: The coating assembly (76) of any of clauses 16 to 28, including at least one coating layer (80, 82) over at least a portion of a first surface (12) of the substrate (10). For example, the first surface (12) can be an outer surface.

Clause 30: The coating assembly (76) of clause 29, wherein the at least one coating layer (80, 82) is selected from the group consisting of a photochromic coating layer (80) and a protective coating layer (82).

Clause 31: The use of a coating assembly (76) of any of clauses 16 to 30 in a process for making a coated substrate (10), such as a coated polymeric substrate (10), such as a coated polymeric lens (11), such as a photochromic polymeric ophthalmic lens (11).

It will be readily appreciated by those skilled in the art that modifications, as indicated above, may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A method of making a coated substrate, comprising:
    applying at least one coating composition over at least a portion of a first surface of a substrate; and
    curing the at least one coating composition to form at least one coating layer,
    wherein the method includes positioning a heat sink adjacent a sidewall of the substrate,
    wherein the heat sink comprises a pliable metal foil,
    wherein the substrate comprises a polymeric lens, and
    wherein a second side of the metal foil extends around a second edge of the substrate and at least a portion of the second side of the metal foil contacts at least a portion of a second surface of the substrate.

2. The method of claim 1, wherein the heat sink is spaced from the sidewall by a distance in the range of 0 mm to 1 mm.

3. The method of claim 1, wherein a first side of the heat sink does not extend beyond a first edge of the substrate.

4. The method of claim 1, wherein the substrate comprises a polymeric lens, and the method comprises wrapping the metal foil around and in direct contact with the sidewall of the polymeric lens, and wrapping at least a portion of a second side of the metal foil around a second edge of the polymeric lens, wherein at least a portion of the second side of the metal foil is in direct contact with at least a portion of a second surface of the polymeric lens.

5. The method of claim 1, including applying the at least one coating composition by a process selected from the group consisting of spray coating, spin coating, spread coating, dip coating, and roll-coating.

6. The method of claim 1, wherein the curing step comprises subjecting the at least one coating composition to a temperature of at least 125° C.

7. The method of claim 1, wherein the substrate comprises a polymeric lens, and the method comprises:
    positioning a metallic heat sink adjacent a sidewall of the polymeric lens;
    applying a photochromic coating composition over at least a portion of a first surface of the polymeric lens;
    curing the photochromic coating composition to form a photochromic layer;
    applying a protective coating composition over the photochromic coating layer;
    curing the protective coating composition to form a protective layer; and
    separating the polymeric lens from the heat sink.

8. A coating assembly for making a coated substrate, comprising:
    a substrate having a sidewall; and
    a heat sink adjacent the sidewall, wherein the heat sink is located in the range of 0 mm to 1 mm from the sidewall, wherein the heat sink comprises a pliable metal foil, wherein the substrate comprises a polymeric lens, and wherein a second side of the metal foil extends around a second edge of the substrate and at least a portion of the second side of the metal foil contacts at least a portion of a second surface of the substrate.

9. The method of claim 1, wherein the pliable metal foil is wrapped around the sidewall of the substrate to form a multi-layer heat sink.

10. The coating assembly of claim 8, wherein the pliable metal foil is wrapped around the sidewall of the substrate to form a multi-layer heat sink.

* * * * *